UNITED STATES PATENT OFFICE.

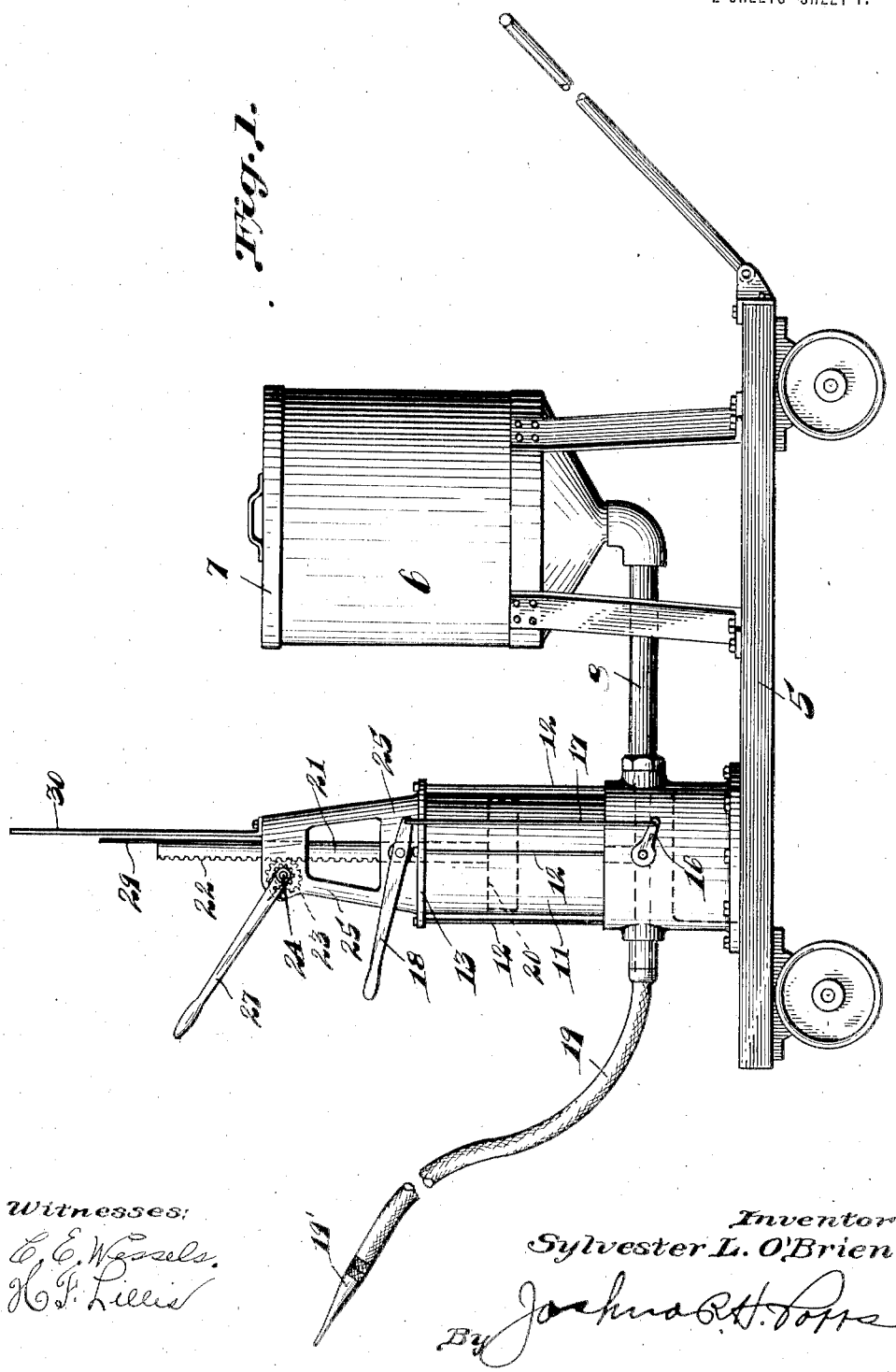

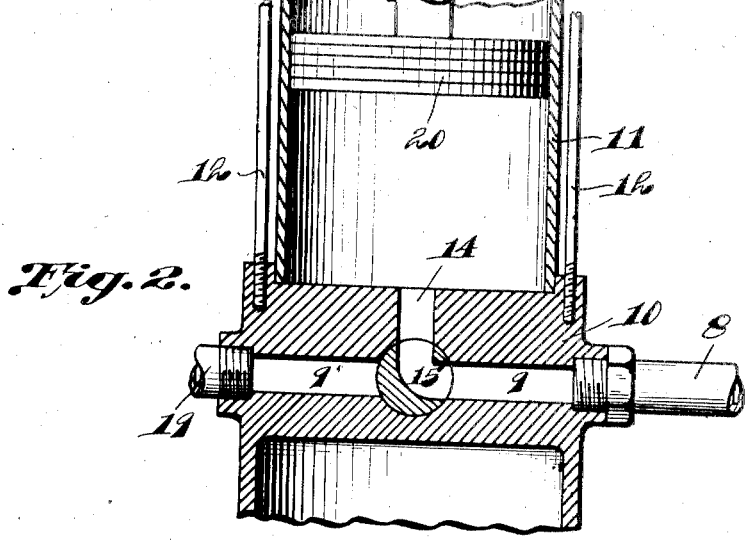

SYLVESTER L. O'BRIEN, OF CHICAGO, ILLINOIS.

GREASE-GUN.

1,341,148.　　　　Specification of Letters Patent.　　Patented May 25, 1920.

Application filed April 2, 1919. Serial No. 286,827.

*To all whom it may concern:*

Be it known that I, SYLVESTER L. O'BRIEN, a citizen of the United States, and a resident of the city of Chicago, county of Cook and State of Illinois, have invented certain new and useful Improvements in Grease-Guns, of which the following is a specification.

My invention relates to improvements in grease guns and has for its object the provision of an improved construction of this character whereby measured quantities of grease, or other heavy lubricant, may be readily injected or supplied where desired.

Other objects will appear hereinafter.

The invention consists in the combinations and arrangements of parts hereinafter described and claimed.

The invention will be best understood by reference to the accompanying drawings forming a part of this specification, and in which, Figure 1, is a side view of a construction embodying the invention, Fig. 2, an enlarged vertical section taken through the lower portion of a measuring cylinder employed in the construction, Fig. 3, a perspective view illustrating the connection and operation of the operating lever of the device, and Fig. 4, an enlarged face view illustrating the arrangement and coöperation of the indicator finger and scale employed in the device.

The preferred form of construction, as illustrated in the drawings, comprises a suitable wheeled truck 5, having a reservoir 6 suitably mounted thereon, and provided with a removable cover 7 to permit of the insertion of a supply of grease or other heavy lubricant, and with a discharge pipe 8 leading from the bottom thereof, which is preferably hoppered, as shown. The discharge pipe 8 leads to one end of a horizontal passage 9—9' leading transversely through the cylinder base 10 mounted on the truck 5 adjacent the reservoir 6. A cylinder 11 is removably mounted on the base 10 as indicated, said cylinder being held in place by means of long bolts 12 passing through a clamping ring or flange 13, as shown. A vertical passage 14 leads centrally from the bottom of cylinder 11 into the central portion of passage 9—9', and a rotatable valve 15 is located at the juncture, as shown. The valve 15 is operated by means of a rocker arm 16 located on the outside of base 10 connected by a link 17 with an operating lever 18, as shown. A discharge hose or pipe 19 leads from the outer end of passage 9' and is equipped at its free end with a nozzle 19' by means of which the grease or other lubricant discharged through the hose 19 may be injected into bearings or small spaces, as desired.

The cylinder 11 is equipped with a piston 20 operable by a piston rod 21 having a rack bar 22 formed on one side thereof. Rack bar 22 meshes with a pinion 23 on an operating shaft 24 which is mounted in a suitable bracket 25 formed on the ring or flange 13, as indicated. The shaft 24 carries a double-acting ratchet wheel 26 fixed to the outer end thereof, and an operating lever 27 is mounted to rotate freely on the outer end of said shaft, said lever 27 being provided with a double-acting spring-held pawl 28, and by means of which the ratchet 26, shaft 24, and pinion 23 may be rotated in either direction as desired, by simply setting the pawl 28 in either of its operative positions.

The piston rod 21 carries an indicator finger 29 at its upper end coöperating with a scale plate 30, said scale plate 30 being provided on its face with different scales 31, 32, 33 and 34, graduated to correspond with different grades of grease or grease of different specific gravities, said scales being arranged to indicate the weights of these greases of different grades contained in the cylinder 11 for different heights of the piston 20, as will be readily understood.

In operation, a suitable charge of grease is drawn into the cylinder 11 by operating lever 27 to raise the piston 20, such operation being continued, under powerful leverage, until the desired quantity of grease is drawn into said cylinder from the reservoir 6, the valve being positioned as indicated in Fig. 2. Thereupon, the position of the valve 15 is reversed by depressing lever 18, and the position of pawl 28 reversed to cause reverse operation of shaft 24, and consequently, of piston 20. This action serves to discharge the grease under powerful pressure into any desired location through the nozzle 19'.

While I have illustrated and described the preferred form of construction for carrying my invention into effect, this is capable of variation and modification without departing from the spirit of the invention.

I, therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described comprising a cylinder; a piston operating in said cylinder; a piston rod for operating said piston and projecting from one end of said cylinder; a rack bar on said rod; a pinion meshing with said rack bar; an operating lever mounted on the end of said cylinder through which the piston rod projects and operatively connected with said pinion; pipes leading into and out of the other end of said cylinder; a manually operable valve arranged to open the cylinder connection with each pipe and simultaneously close the cylinder connection with the other pipe; a valve operating lever mounted on the opposite end of said cylinder adjacent said first mentioned operating lever; and an operative connection between said valve operating lever and said valve, substantially as described.

2. A device of the class described comprising a cylinder base having a horizontal passage extending transversely therethrough, and a vertical passage leading from the central portion of said horizontal passage and forwardly through the top of said cylinder base; a cylinder in the form of a tube open at both ends and removably seated on said cylinder base; a clamping ring engaging the upper end of said tube; long bolts connecting said clamping ring with said base; a rotatable valve at the juncture of said horizontal and vertical passages; a standard mounted on top of said cylinder; a piston in said cylinder carrying a piston rod projecting through the top of said cylinder and said standard; a rack bar on said piston rod; a pinion mounted on said standard and meshing with said rack bar; an operating lever mounted on said standard and having a double-acting pawl and ratchet connection with said pinion; and a valve operating lever mounted on said standard and operatively connected with said valve, substantially as described.

In testimony whereof I have signed my name to this specification in the presence of two subscribing witnesses.

SYLVESTER L. O'BRIEN.

Witnesses:
   JOSHUA R. H. POTTS,
   HELEN F. LILLIS.